(12) United States Patent
Ting

(10) Patent No.: US 7,448,890 B2
(45) Date of Patent: Nov. 11, 2008

(54) MEMORY CARD CONNECTOR WITH CARD EJECT MECHANISM

(75) Inventor: Chien-Jen Ting, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/002,549

(22) Filed: Dec. 18, 2007

(65) Prior Publication Data

US 2008/0146059 A1 Jun. 19, 2008

(30) Foreign Application Priority Data

Dec. 18, 2006 (TW) .................. 95222241

(51) Int. Cl.
*H01R 13/62* (2006.01)
(52) U.S. Cl. ...................................... 439/159
(58) Field of Classification Search ................. 439/630, 439/152–160, 564, 570, 573, 101, 607
See application file for complete search history.

(56) References Cited

U.S. PATENT DOCUMENTS 6,095,835 A * 8/2000 Oguchi ........................ 439/159
6,626,689 B1 * 9/2003 Yu ............................... 439/159
7,018,222 B2 3/2006 Molex
2005/0272283 A1 12/2005 Molex
2007/0054526 A1 * 3/2007 Kimura et al. ............... 439/159

FOREIGN PATENT DOCUMENTS

TW 267685 6/2005
TW 247460 1/2006

* cited by examiner

*Primary Examiner*—Edwin A. León
(74) *Attorney, Agent, or Firm*—Wei Te Chung

(57) ABSTRACT

A memory card connector includes a metal housing defining a card-receiving space in which a memory card is insertable in a card insertion direction through an insert opening generally at a front end of the metal housing to correspondingly connect with contacts mounted in a terminal socket at a rear end of metal housing, a pair of independently card eject mechanisms installed to the connector for ejecting memory card from the connector. And, one of the card eject mechanisms is generally disposed at one end of terminal socket and within an inside of the metal housing, and the other card eject mechanism is disposed at outside of the metal housing.

17 Claims, 7 Drawing Sheets

MEMORY CARD CONNECTOR WITH CARD EJECT MECHANISM

BACKGROUND OF THE INVENTION

1. Field of the Invention

The present invention is directed to a memory card connector, and more specifically, to a memory card connector with card eject mechanism.

2. Description of Related Arts

Memory cards are known in the art and contain intelligence in the form of a memory circuit or other electronic program. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card.

In order to facilitate widespread use of memory cards, certain standards have been developed, for example the PCM-CIA (Personal Computer Memory Card International Association) standard that defines, inter alia, the connection interface and external dimensions of the cards. In later of 2003, a new standard, Express Card, is published by PCMCIA. This new Express card standard has two different types, a rectangular memory card, and a L-shaped memory card. Accordingly, two different types memory card connectors are provided to accommodate these two express cards. Noticeably, a rectangular memory card connector can only accommodate a rectangular memory card, and a L-shaped memory card connector can accommodate two different types memory cards respectively.

Conventional memory card connectors are illustrated in U.S. Pat. No. 7,018,222B2 issued at Mar. 28, 2006 and U.S. Pub. No.: 2005/0272291A1 published at Dec. 8, 2005, which are assigned to same assignee, Molex. These memory card connectors include a card eject mechanism for ejecting cards from the connectors by push-push operation. Each card eject mechanism has a cam slider installed on the connector housing and with a cam slot defined therein, a cam follower moveably sliding in cam slot to drive the card to repeatedly locate between a locking position and an original position, a coil spring for biasing the cam slider in an card ejection direction. And, each cam slider has a transverse portion (See 74b in US 2005/0272283A1, and 76a in U.S. Pat. No. 7,018,222B2) for mating with a front face of card when a card is in an insertion process, and biasing the card out when a card is in an ejecting process. However, in cited references, when the card is inserted in the connector, an electrical connection between the card and contacts in connector housing may be affected for a loose of the card along a vertical direction. And, in U.S. Pat. No. 7,018,222B2, for reason of taking up much space of connector housing by the card eject mechanism, the housing has no space for shaping a guiding slot thereon to guide an insertion of the card. In US 2005/0272283A1, the base 76, and the terminal socket 38, molded respectively and assembled in the connector later, makes a whole structure of the connector complex and difficult to assemble. Similar structures referring to memory card connectors are also described in later references, such as Taiwan Patent Nos. 267685, 247640, issued respectively at Jun. 11, 2005, and Jan. 11, 2006, and assigned to Tai Twun, and Molex.

Further, in U.S. Pat. No. 7,018,222B2, a pair of independently operable card eject mechanisms 72 is generally at opposite ends of the insulting terminal socket 38 for ejecting two different memory cards respectively. However, first, to shape the insulating terminal socket 38 with two receiving space at two opposite ends thereof for receiving card eject mechanisms 72 makes both of two lateral arms thereof thin and easy to wrap. Second, each of card eject mechanisms 72 is located within the metal housing 40 and inaccessible from exterior. Thus, either one of the card eject mechanism 72 is out of work, operation to take apart the metal shell 40 from the printed circuit board for replacing or repairing the disabled card eject mechanism, and to repeatedly install the metal shell 40 to the printed circuit board, as by soldering or screw, is needed, and complex. Third, because two independently card eject mechanisms are located at two ends of the terminal socket and in a linear array along a transverse direction of the terminal socket, during a card ejection process, ejection distances of the front edges 76a are equal to each other. Sequentially, in practice, even through the memory card is ejected to move an ejection distance by two parallel card eject mechanisms simultaneously, the memory card is, maybe, still connected with a mating tongue 66b, and an incomplete card ejection is raised.

Hence, a memory card connector having card eject mechanism is desired.

SUMMARY OF THE INVENTION

Accordingly, an object of the present invention is to provide a memory card connector with a new and improved card eject mechanism.

Another object of the present invention is to provide a memory card connector, which is simple in structure and easy to assemble.

The third object of the present invention is to provide a memory card connector, with two card eject mechanisms for ejecting a card from the connector synchronously.

In the exemplary embodiment of the invention, a memory card connector includes a metal housing defining a card-receiving space in which a memory card is insertable in a card insertion direction through an insert opening generally at a front end of the metal housing to correspondingly connect with contacts mounted in a terminal socket at a rear end of metal housing, a pair of independently card eject mechanisms installed to the connector for ejecting memory card from the connector. And, one of the card eject mechanisms is generally disposed at one end of terminal socket and within an inside of the metal housing, and the other card eject mechanism is disposed at outside of the metal housing.

according to another embodiment of the invention, a memory card connector includes a metal housing defining a card-receiving space in a horizontal plane in which a memory card is insertable in a card insertion direction through an insert opening generally at a front end of the metal housing, a terminal socket at a rear end of metal housing opposite to the insert opening, and having a transverse main body, a pair of side wings extending forwardly from the main body, wherein one of the pair side wings having an extended piece in an inside thereof; a card eject mechanism of a push-push type installed at the extended piece and having a cam slider slidably moving relative to the extended piece and having a cam slot thereon, a push tab at a rear end thereof for abutting against a front edge of the memory card, a cam follower slidably moving in the cam slot, and a spring for ejecting the card along a card ejection direction opposite to the insertion direction; wherein said card eject mechanism has a locking piece at a front end thereof and spaced relative to the push tab along the insertion direction for holding the memory card along a direction perpendicular to said horizontal plane.

Other objects, advantages and novel features of the invention will become more apparent from the following detailed description of the present embodiment when taken in conjunction with the accompanying drawings.

BRIEF DESCRIPTION OF THE DRAWING

FIG. 1 is a perspective, assembled view of a memory card connector in accordance with the present invention, with a memory card received in;

DETAILED DESCRIPTION OF THE PREFERRED EMBODIMENT

Figure 1:
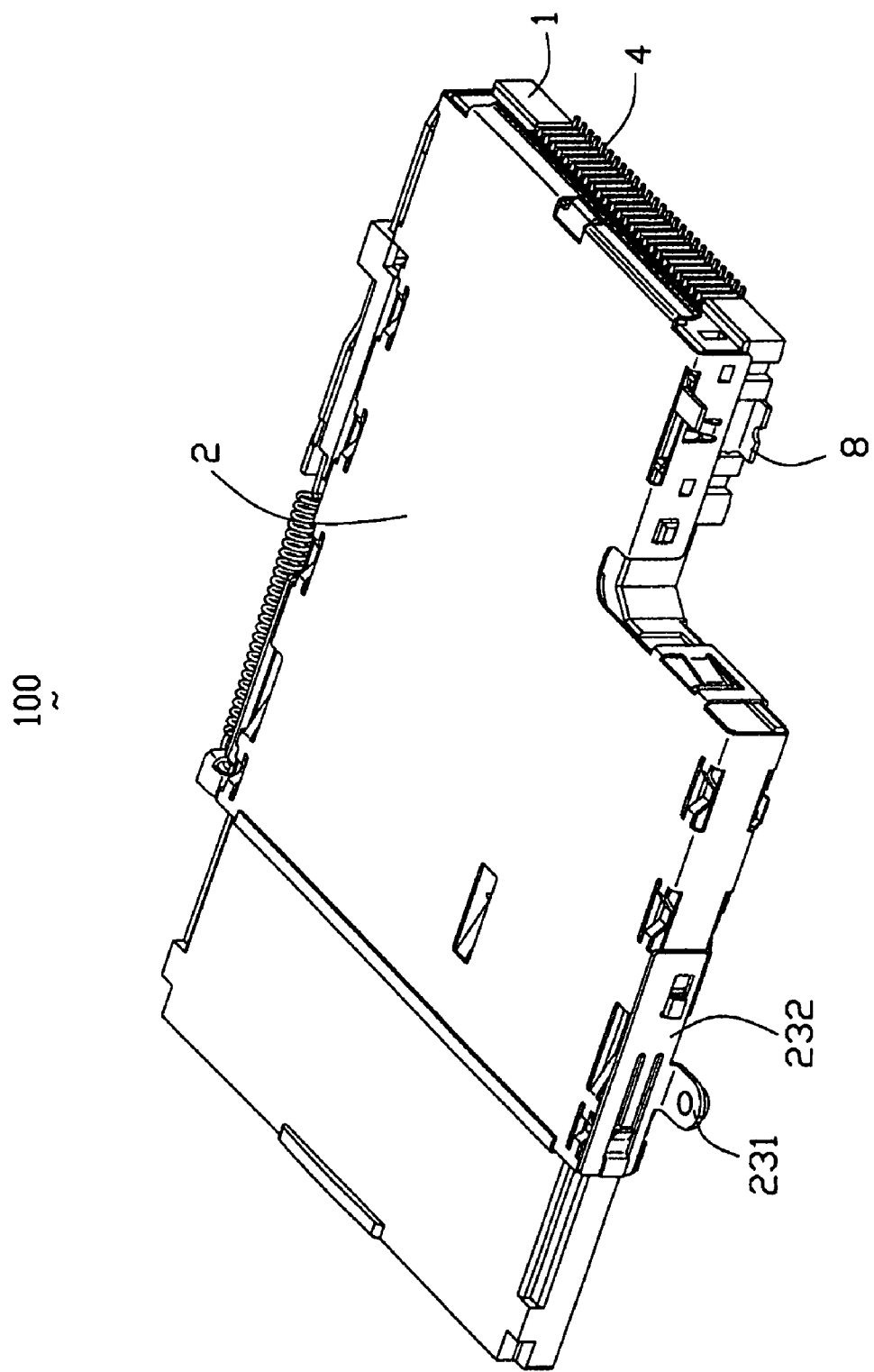

Referring to the drawings in greater detail, and first to FIGS. 3-6, the invention is embodied in a memory card connector with a generally L-shape configuration, generally designated 100, for receiving two memory cards, namely a rectangular memory card, and a L-shaped memory card that are according to Express Card specification. Connector 100 includes an insulative terminal socket 1, which is mounted to a printed circuit board (not shown) and with a plurality of contacts 4 mounted in the terminal socket 1, and an outer, shielding metal housing 2 shielding over the terminal socket 1. A pair of independently operable card eject mechanisms 5, 9 are installed at opposite sides of the connector 100 for ejecting the memory cards from the connector 100 synchronously.

Figure 2:
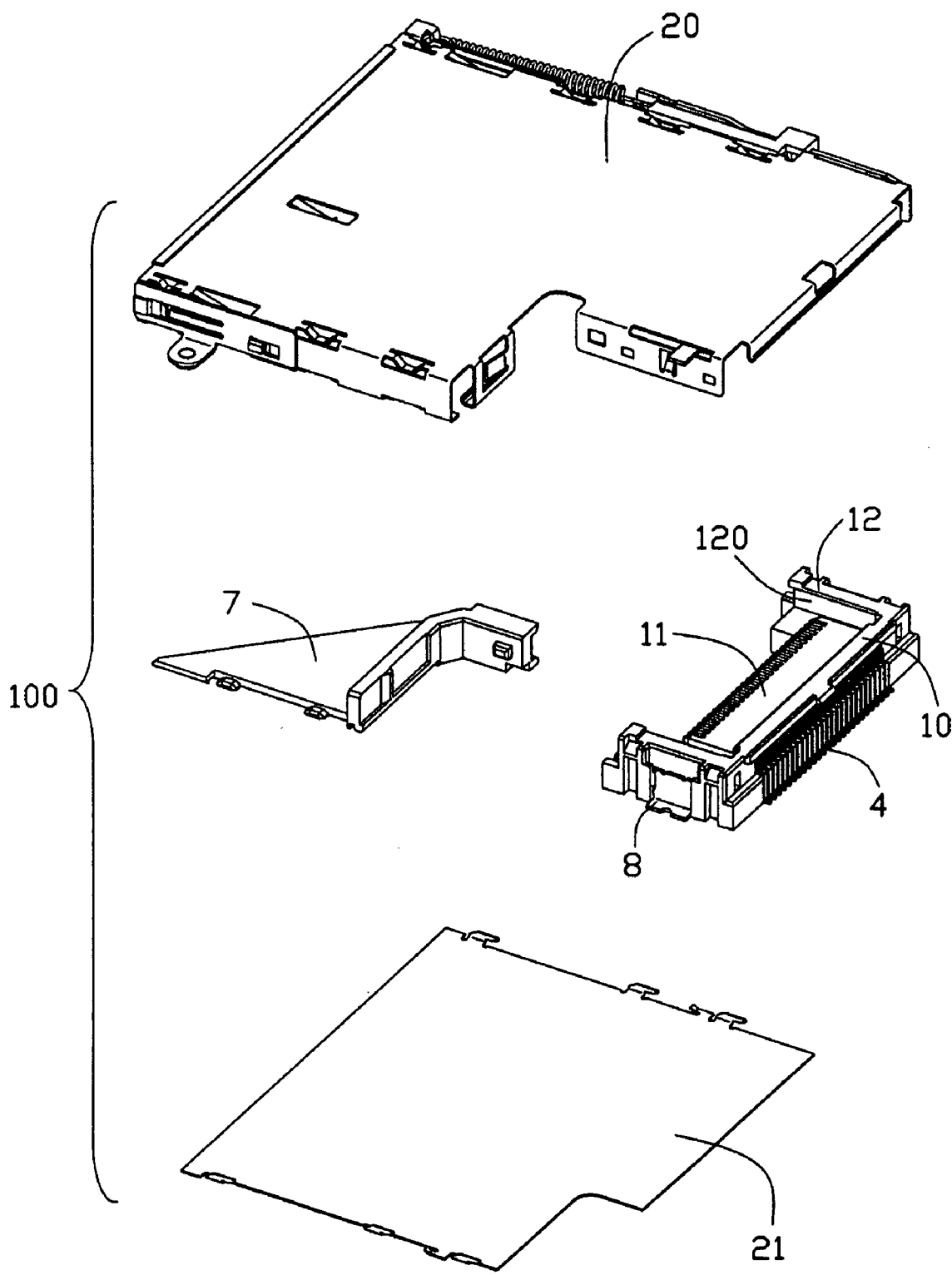
FIG. 2 is a perspective, exploded view of the memory card connector.
Figure 3:
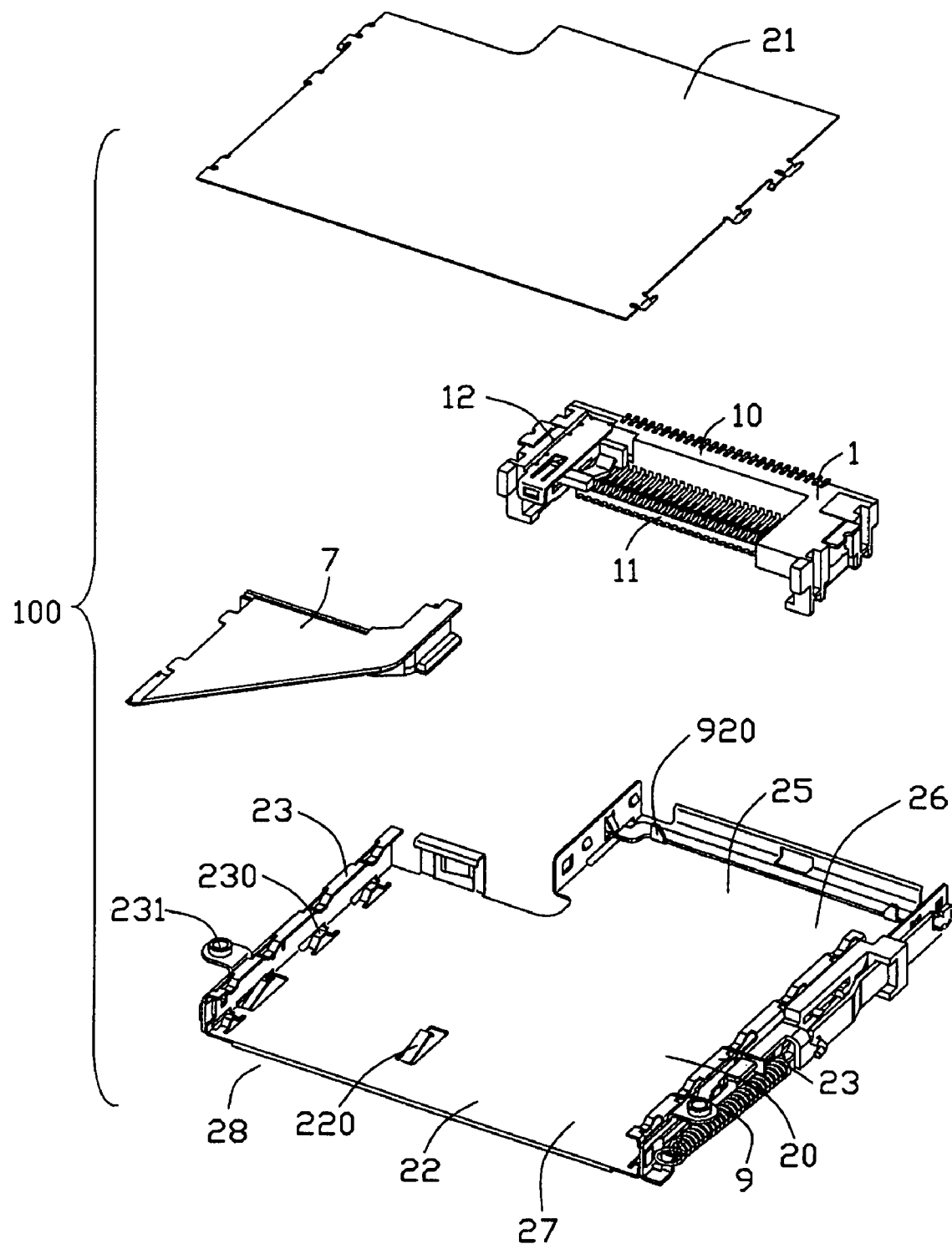
FIG. 3 is a view similar to FIG. 2, but taken from different aspect.

More particularly to FIGS.2-3, metal housing 2 has an upper housing half 20, and a lower housing half 21 together connected to the housing half 20. Each of housing halves 20, 21 is stamped and formed of conductive sheet metal material. The upper housing half 20 includes a top wall 22, and a pair of sidewalls 23 downwardly extending from the top wall 22 which define a card-receiving space 25, together with the lower half 21, therebetween. In another exemplary embodiment of the invention, the lower half 21 is omitted, and only an upper half 20 is provided for shielding the terminal socket 1, without departing from inventive spirit of present invention. The metal housing 2 has a wider front end portion 27 and a narrower rear end portion 26, whereby card-receiving space 25 is generally L-shaped in a horizontal plane. Of course, the term "horizontal" is not meant to be limiting but is descriptive of depiction according to the drawings. A front insert opening 28 is defined at the front of the metal housing 2 between sidewalls 23 thereof, through which two memory cards are inserted to the card-receiving space 25 along a card insertion direction. Guide grooves 29 are defined in the insides of the sidewalls 23 of the metal housing 2. Each of sidewalls 23 forms a lengthwise piece (not labeled) in card insertion direction as a part thereof, which is essentially parallel to the top wall 22 of the metal housing 2, and includes a plurality of spring 230 inwardly stamped toward the card-receiving space 25, together with springs 230 formed on the top wall 22, to guide an insertion of memory cards, and reliably abut against the memory cards from top and bottom sides thereof. A pair of stand off devices 232 is installed to metal housing 2 at two sides of the insertion opening 28. Each of stand off devices 232 has a grounding tab 231 projecting outwardly therefrom for mounting the connector 100 to a printed circuit board. Obviously, stand off devices 232 can regarded as a part of the metal housing 2 and both uniquely stamp from a single conductive sheet. In addition, a spring 220 is stamped inwardly from the top wall 22 toward the card-receiving space 25 to abut against a lateral edge of the rectangular card, when the rectangular card is inserted into or pulled from, for avoiding a bias of the card from its straight way.

Figure 4:
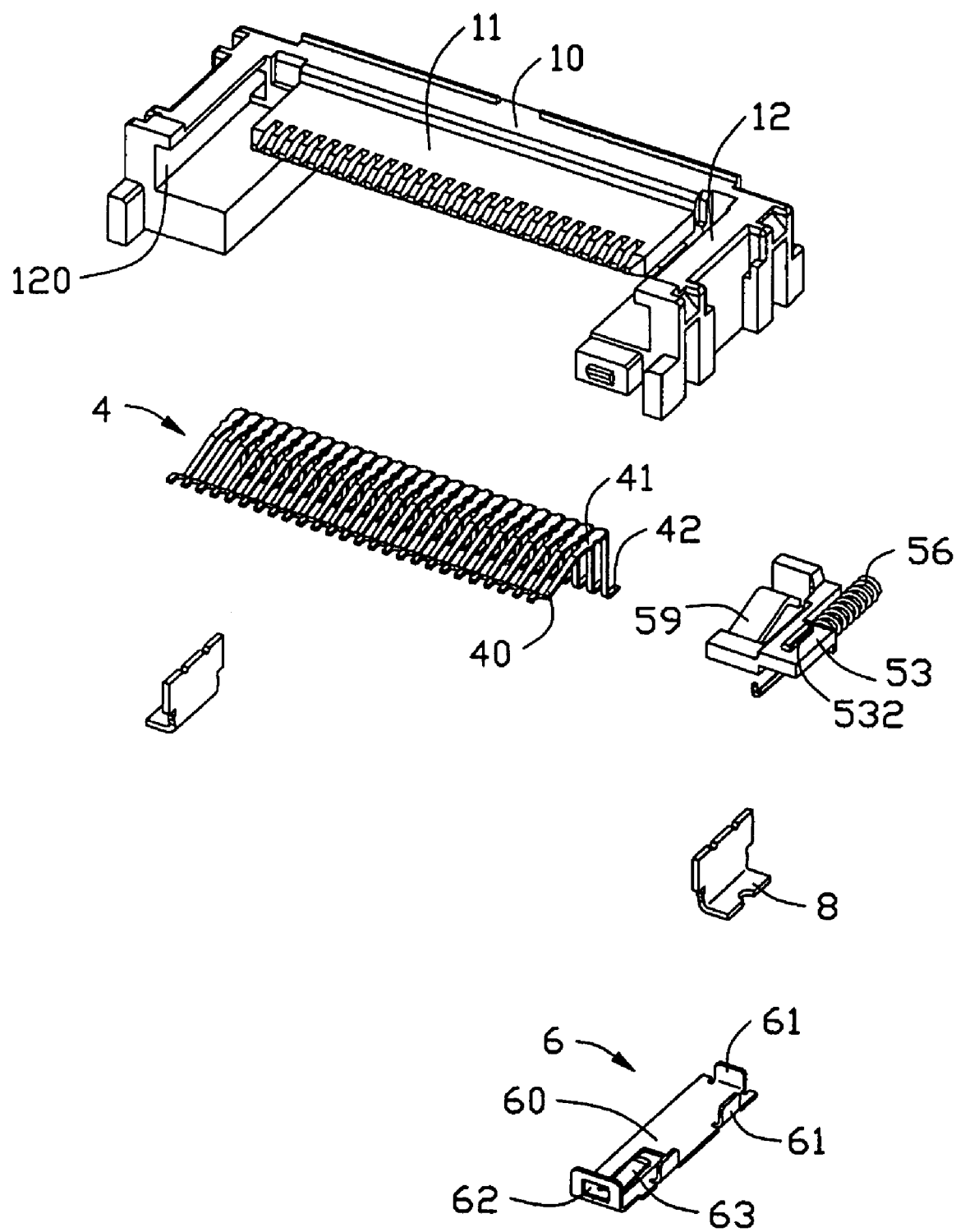
FIG. 4 is a perspective, exploded view of parts of the memory card connector.
Figure 5:
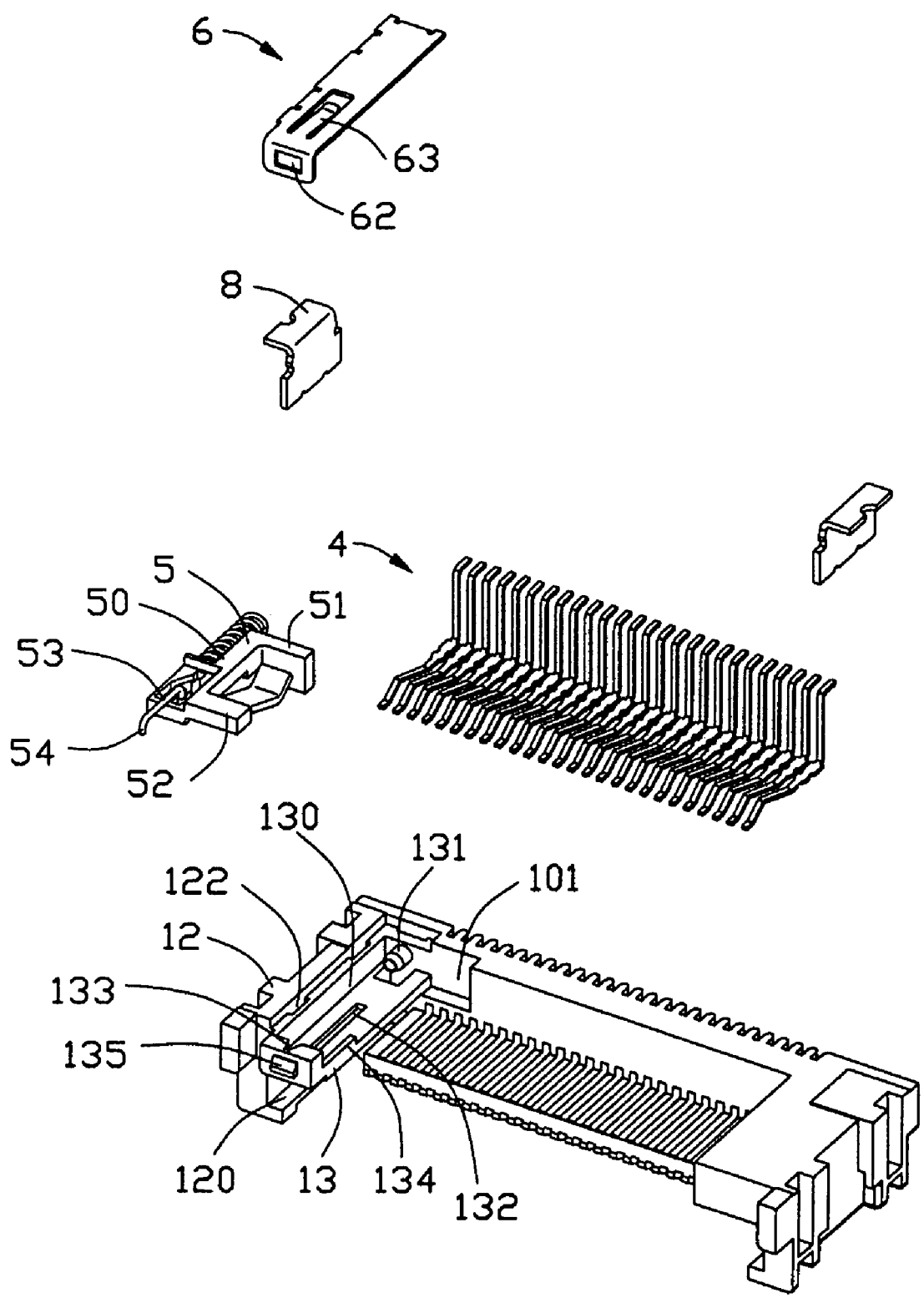
FIG. 5 is a view similar to FIG. 4, but taken from different aspect.
Figure 6:
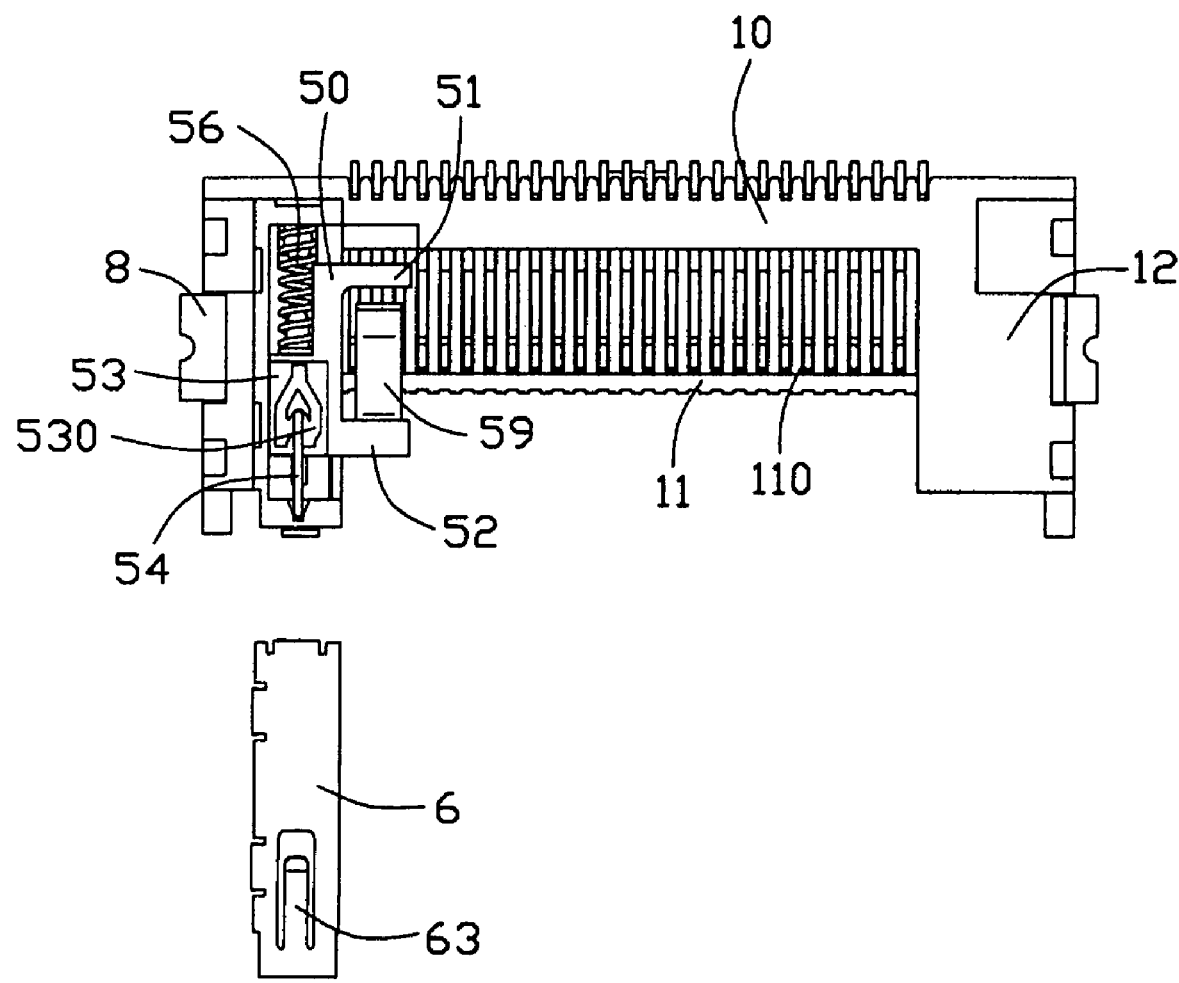
FIG. 6 is planar view of parts of the memory card connector.

Referring to FIGS. 4-6, the terminal socket 1 is integrally molded of dielectric material such as plastic or the like, and has a transverse main body 10 defining a mounting side and a mating side, a pair of side wings 12 extending forwardly from the main body 10 and located at the mating side, and a mating tongue 11 located between the pair of side wings 12. A pair of guide slot 120, with a length longer than that of mating tongue 11 along the card insertion direction, is defined in the insides of the side wings 12 for guiding an insertion card. A plurality of terminal-receiving passageways 110 extends through the main body 10 and the mating tongue 11, and is open toward the card-receiving space 25 at a front of the terminal socket 1. A plurality of contacts 4, as illustrated in FIG. 4, is mounted in the terminal socket 1. Each contact 4 has mating end 40 projecting from terminal-receiving passageway 110 for engaging with the cards, and a retaining portion 41 reliably mounted within the passageway 110, and a tail end 42 extending beyond the main body 10 and within the mounting side for connection, as by soldering, to appropriate trace on printed circuit board.

More particularly referring to FIGS. 4-6, one side wing 12 of the terminal socket 1, which is generally in a linear array relative to the spring 220 in card insertion direction, forms a L-shaped extended piece 13 in an inside thereof and at a middle position along a vertical height thereof. Thus, an inside of the side wing 12, is divided into two separate spaces in said vertical height, one is guide slot 120 described as above, and the other is a receiving groove 130 for receiving the card eject mechanism 5.

The extended piece 13 has a lengthwise portion (not labeled) being essentially parallel to the mating tongue 11, and a vertical portion (not labeled) at a front of the terminal socket 1 for providing a close groove 130 along the card insertion direction. A lengthwise slot 132 extends through the lengthwise portion and has a predetermined length. A through hole 133 is defined in the vertical portion. In addition, within the mating side of transverse main body 10, a post 131 is formed opposite to the vertical portion, and a cut 101 is depressed rearwardly from an inner surface thereof and located at an inside of the groove 130.

The card eject mechanism 5 of a push-push type, as illustrated in FIG. 5, has a cam slider 50 with a cam slot 530 therein, such as a heart slot known in this art, moveably mounted within the receiving groove 130 along the card insertion direction, a generally U-shaped cam follower 54 with one hook end thereof fixed within the through hole 133, and the other hook end thereof slidably moving in cam slot 530, and a coil spring 56 sandwiched between the transverse main body 10 and the cam slider 50 to constantly bias the cam slider 50 forwardly in an card ejection direction. In this exemplary embodiment, the coil spring 56 is hold by posts 131 formed at either transverse main body 10 or cam slider 50. The cam slider 50 has a lengthwise main base 50, a lateral portion 53 at a side of the base 50 with the cam slot 530 disposed thereon, a traverse push tab 51 at a rear thereof, and a locking piece 52 at a front thereof and opposite to traverse push tab 51 in the card insertion direction. The lateral portion 53 is movably received in receiving groove 130 and transversely limited by a bar 134 formed at the lengthwise portion of the extended piece 13. The push tab 51 and the locking piece 52 inwardly extends beyond the bar 134 and are in a linear array along the card insertion direction. And, a lengthwise protrusion 532 is formed at a surface of the lateral portion 53 to slidably move within the lengthwise slot 132. Noticeably, for preventing interference to electrical connection between the card and the contacts 4 by a loose or fluctuation of card along a vertical direction, a generally V-shaped metal tab 59 is integrally assembled to the locking piece 52 in the card insertion direction for holding the card in vertical direction. Obviously, this V-shaped metal tab 59 also can replace by an insulating V-shaped tab that is formed as a part of the locking piece 52.

More particularly, FIG. 6 show how card eject mechanism 5 operate sequentially in response to insertion of memory card into the card-receiving space 25 of the connector 100. The memory card is inserted into the card-receiving space 25, until the front edge abuts the push tab 51 along the card insertion direction. The memory card drives the push tab 51 to rearwardly move and maybe to be located in the cut 101. Synchronously, a slidable hook end of the cam follower 54 sliders in the cam slot 530 from a first position to a locking position (shown in FIG. 6). In locking position of the card, appropriate contacts on the card engage the mating end 40 of the contacts 4. When it is desired to eject the memory card, the memory card is pushed inwardly a second time in the card insertion direction, whereupon the locked condition of the card is released as slidable hook end of cam follower 54 moves along the cam slot 530, and whereupon coil spring 56 is effective to bias the card to a first position and allow the card to be withdrawn from the card-receiving space 25 of the connector 100. This operation process is known as a push-push type in this art.

Turning to FIGS. 5-6, for preventing the cam follower 54 deviating from the cam slot 530 of the cam slider 50, and holding the card eject mechanism 5 in the receiving groove 130, a generally L-shaped metal piece 6 is provided. This metal piece 6 has a main base 60 covering over the cam slot 530 and the spring 56, a locking cut 62 for locking with a locking protrusion 135 formed at the vertical portion of the extended piece 13, a plurality of locking pieces 61 extending from edges of the main base 60 for being inserted into corresponding locking slots 122 defined in the side wing 12, and a spring 63 inwardly stamped toward cam slot 530 for holding the cam follower 54 in position.

Figure 7:
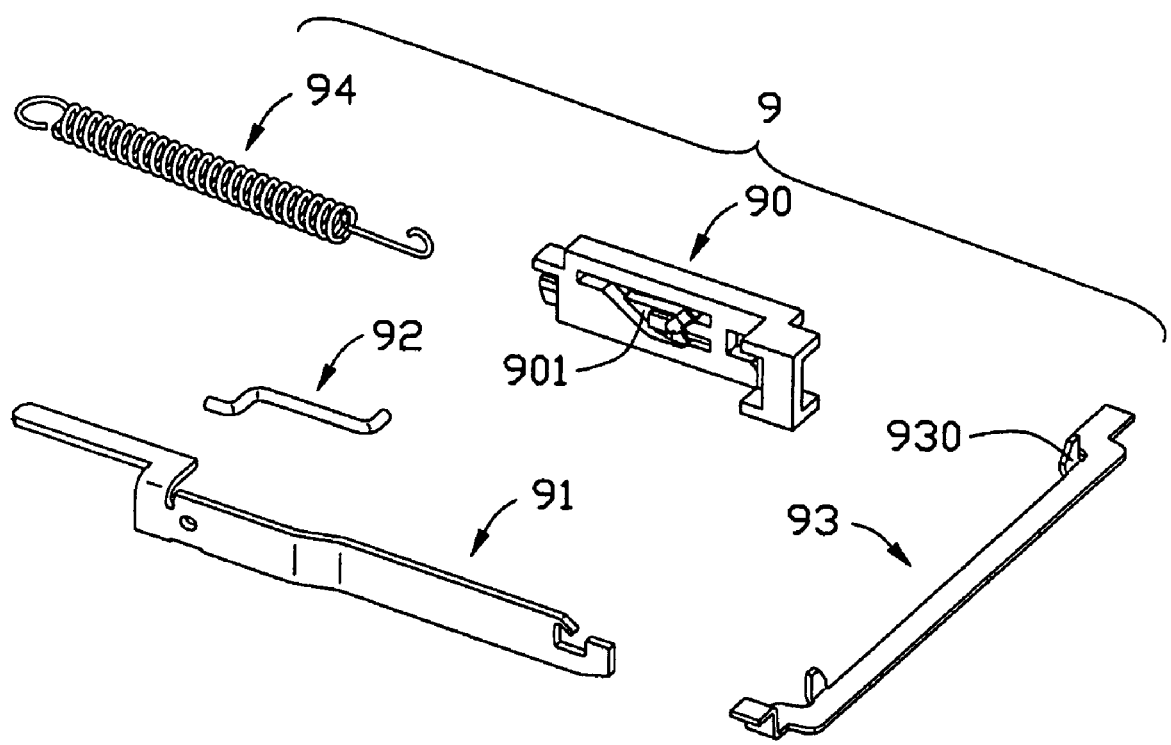
FIG. 7 is perspective, explodes view of a card eject mechanism of the memory card connector in accordance with the present invention.

More particularly, referring to FIG. 7, a second card eject mechanism 9 of a push/push type is provided at an outside of the metal housing 2, and is totally independent of the card eject mechanism 5 so that these two card eject mechanisms 5, 9 apply independent ejection forces on the memory card. Noticeably, a detailed description, about this type card eject mechanism 9, is shown in U.S. Pat. No. 7,118,396B2, which is issued in Oct. 10, 2006, and assigned to a same assignee as the instant invention. Referring FIG. 7 in conjunction with U.S. Pat. No. 7,118,396B2, the second card eject mechanism 9 has a cam slider 90 fixedly assembled to a sidewall 23 of the metal housing 2 and with a cam slot 901 defined thereon, a push rod 91 movably connected with the cam slider 90, a cam follower 92 assembled on the push rod 91 and sliding in the cam slot 901, an ejecting rod 93 defining one end connected with the push rod 91, and a spring 94 with one end connected to the cam follower 92, and the other end connected to stand off device 232, for urging the posh rod 91 to move along a card ejection direction. The ejecting rod 93 essentially extends transversely through a whole length of the terminal socket 1 with a distal end associatively supported by the metal housing 2 and is exposed into the card-receiving space 25. The detailed operation process and the principle of this push-push type card eject mechanism 9 is known in this art in view of cited references as above and is omitted thereafter.

Noticeably, instead of disposing two card eject mechanisms in two opposite end of the terminal socket and within two insides of the metal housing illustrated in cited reference, U.S. Pat. No. 7,018,222B2, the instant invention discloses two independently card eject mechanisms 5, 9 which one of these two is disposed at an inside of the terminal socket 1 and within the metal housing 2, and the other 9 is disposed at an outer of the metal housing 2, for preventing both of side wings 12 being thin firstly as shown in said reference, and replacing the outer card eject mechanism 9 conveniently, whereby an user does not need to take away the metal housing and replace either one of disabled card eject mechanisms disposed in the terminal socket as shown in U.S. Pat. No. 7,018,222B2. In addition, it is noted that the card eject mechanism 5 is disposed at the narrower rear end portion 26, and the second card eject mechanism 9 is stagger relative to the card eject mechanism 5 from a side view, as shown in FIG. 3. Third, when in a card ejection process, these two card eject mechanisms 5, 9 apply independent ejection forces on the memory card, particularly at one side front edges of the card, by push tab 51 of card eject mechanism 5, and the push tab 930 formed at the second card eject mechanism 9, respectively. Fourth, for ejecting the memory card completely, these two card eject mechanisms 5, 9 provide different eject distances, the outer card eject mechanism 9 provides a large eject distance than the inner card eject mechanism 5 for ejecting the card from the card-receiving space 25 completely. Obviously, without departing from inventive spirit of present invention, the card eject mechanism 5 can provide large eject distance than the second card eject mechanism 9.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A memory card connector comprising: a metal housing defining a card-receiving space in which a memory card is insertable in a card insertion direction through an insert opening generally at a front end of the metal housing to correspondingly connect with contacts mounted in a terminal socket at a rear end of metal housing;
   a pair of independently card eject mechanisms installed to the connector for ejecting memory card from the connector; wherein
   one of the card eject mechanisms is generally disposed at one end of terminal socket and within an inside of the metal housing, and the other card eject mechanism is disposed at outside of the metal housing.

2. The memory card connector as described in claim 1, wherein the pair of independently card eject mechanisms are stagger relative to each other along the card insertion direction.

3. The memory card connector as described in claim 1, wherein each of the card eject mechanisms has a push tab for engaging the memory card generally at front edge of one same side of the memory card.

4. The memory card connector as described in claim 1, wherein one of the card eject mechanism has a larger eject distance than the other card eject mechanism for providing complete card ejection.

5. The memory card connector as described in claim 1, wherein the terminal socket has a transverse main body, a pair of side wings integral with the main body, one of the side wing defines a receiving groove for the card eject mechanism.

6. The memory card connector as described in claim 1, wherein the front end of the metal housing is wider than the rear end thereof whereby said card-receiving space is generally L-shaped in a horizontal plane.

7. The memory card connector as described in claim 6, wherein the insulative terminal socket is located at the narrower rear end of the metal housing.

8. The memory card connector as described in claim 1, wherein each of the card eject mechanisms comprises a push-push type card eject mechanism.

9. The memory card connector as described in claim 8, wherein the card eject mechanism which is disposed at outside of the metal housing, includes a cam slider fixedly assembled to a sidewall of the metal housing and having a cam slot, a push rod movably connected with the cam slider, a cam follower assembled to the push rod and slidably moving in the cam slot, an ejecting rod defining one distal end connected with the push rod, and a spring for urging the posh rod to move along a card ejection direction.

10. The memory card connector as described in claim 8, wherein the card eject mechanism which is disposed at one end of terminal socket and within an inside of the metal housing, includes a cam slider slidably mounted on the terminal socket and having a cam slot, a cam follower operatively associated with the cam slider and a spring for biasing the cam slider in an ejection direction opposite to said card insertion direction.

11. The memory card connector as described in claim 10, wherein the ejecting rod essentially extends transversely through a whole length of the terminal socket with another distal end associatively supported by the metal housing.

12. The memory card connector as described in claim 1, wherein the metal housing defines a large rectangular configuration with a small rectangular notch configured at a rear corner beside terminal socket from a top view.

13. The memory card connector as described in claim 12, wherein one of the card eject mechanism is located within the metal housing, and laterally beside said small rectangular notch, and the other card eject mechanism is disposed at a sidewall of the metal shell and extends along essentially a full length of the metal housing in the card insertion direction.

14. A memory card connector comprising: a metal housing defining a card-receiving space in a horizontal plane in which a memory card is insertable in a card insertion direction through an insert opening generally at a front end of the metal housing a terminal socket at a rear end of metal housing opposite to the insert opening, and having a transverse main body, a pair of side wings extending forwardly from the main body, wherein one of the pair side wings having an extended piece in an inside thereof; a card eject mechanism of a push-push type installed at the extended piece and having a cam slider slidably moving relative to the extended piece and having a cam slot thereon, a push tab at a rear end thereof for abutting against a front edge of the memory card, a cam follower slidably moving in the cam slot, and a spring for ejecting the card along a card ejection direction opposite to the insertion direction; wherein said card eject mechanism has a locking piece at a front end thereof and spaced relative to the push tab along the insertion direction for holding the memory card along a direction perpendicular to said horizontal plane.

15. The memory card connector as described in claim 14, wherein a V-shaped tab formed by a metal sheet or insulative material associated to the locking piece for abutting a surface of the memory card.

16. The memory card connector as described in claim 14, wherein a second card eject mechanism of a push-push type is disposed at outside of a sidewall of the metal housing and essentially far from said card eject mechanism a whole length of the terminal socket.

17. The memory card connector as described in claim 14, wherein further comprising a metal piece with a generally L-shaped engaging with the side wing for holding the card eject mechanism in position.

* * * * *